United States Patent
Jiang et al.

(10) Patent No.: US 12,155,085 B2
(45) Date of Patent: Nov. 26, 2024

(54) BATTERY PACK

(71) Applicant: CONTEMPORARY AMPEREX TECHNOLOGY (HONG KONG) LIMITED, Hong Kong (CN)

(72) Inventors: Liwen Jiang, Ningde (CN); Haihua Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 360 days.

(21) Appl. No.: 17/418,765

(22) PCT Filed: Apr. 15, 2019

(86) PCT No.: PCT/CN2019/082653
§ 371 (c)(1),
(2) Date: Jun. 25, 2021

(87) PCT Pub. No.: WO2020/133803
PCT Pub. Date: Jul. 2, 2020

(65) Prior Publication Data
US 2022/0059902 A1 Feb. 24, 2022

(30) Foreign Application Priority Data

Dec. 27, 2018 (CN) .......................... 201822224536.8

(51) Int. Cl.
*H01M 50/367* (2021.01)
*H01M 10/625* (2014.01)
(Continued)

(52) U.S. Cl.
CPC ....... *H01M 50/367* (2021.01); *H01M 10/625* (2015.04); *H01M 10/658* (2015.04);
(Continued)

(58) Field of Classification Search
CPC ............. H01M 50/367; H01M 10/625; H01M 10/658; H01M 50/209; H01M 50/249;
(Continued)

(56) References Cited

U.S. PATENT DOCUMENTS

2014/0322566 A1* 10/2014 Kim .................... H01M 50/271
429/56
2015/0030893 A1* 1/2015 Mack et al. ........ H01M 50/367
429/56
2018/0047959 A1* 2/2018 Kruger ................ H01M 50/367

FOREIGN PATENT DOCUMENTS

CN 204651372 U 9/2015
CN 105324867 A 2/2016
(Continued)

OTHER PUBLICATIONS

Kunimitsu, Tomonori; WO 2014024434 A1 English Translation, Feb. 13 (Year: 2014).*
(Continued)

*Primary Examiner* — Matthew T Martin
*Assistant Examiner* — Alexandra J Simmons
(74) *Attorney, Agent, or Firm* — Kilpatrick Townsend & Stockton LLP (57) ABSTRACT

This disclosure relates to a battery pack, including: an upper cover including an upper cover body and an explosion-proof exhaust structure, the upper cover body including a top plate in an upper part and a side plate, and an opening in a lower
(Continued)

part, the explosion-proof exhaust structure being disposed on the side plate, and an exhaust duct being provided between the top plate and the explosion-proof exhaust structure; and a lower housing, where the upper cover is disposed above the lower housing, the lower housing is disposed with batteries, and each of the batteries is provided with an explosion-proof valve.

8 Claims, 6 Drawing Sheets

(51) Int. Cl.
  *H01M 10/658*    (2014.01)
  *H01M 50/209*    (2021.01)
  *H01M 50/249*    (2021.01)
  *H01M 50/271*    (2021.01)
  *H01M 50/383*    (2021.01)

(52) U.S. Cl.
  CPC ....... *H01M 50/209* (2021.01); *H01M 50/249* (2021.01); *H01M 50/271* (2021.01); *H01M 50/383* (2021.01); *H01M 2220/20* (2013.01)

(58) Field of Classification Search
  CPC ........... H01M 50/383; H01M 2220/20; H01M 50/271–282
  See application file for complete search history.

(56) References Cited

FOREIGN PATENT DOCUMENTS

| | | |
|---|---|---|
| CN | 207818679 U | 9/2018 |
| JP | 201873560 A | 5/2018 |
| WO | WO 2014024434 A1 * | 2/2014 ............ H01M 50/24 |

OTHER PUBLICATIONS

Contemporary Amperex Technology Co., Limited, PCT International Search Report and English Translation, PCT/CN2019/082653, Sep. 30, 2019, 6 pgs.

Contemporary Amperex Technology Co., Limited, PCT ISA Written Opinion, PCT/CN2019/082653, Sep. 30, 2019, 4 pgs.

Contemporary Amperex Technology Co., Limited, Extended European Search Report, EP 19904326.6, Dec. 14, 2021, 33 pgs.

* cited by examiner

BATTERY PACK

CROSS-REFERENCE TO RELATED APPLICATIONS

The present application is a United States National Stage Application filed under 35 U.S.C. § 371 of PCT Patent Application Serial No. PCT/CN2019/082653, filed Apr. 15, 2019, which claims priority to Chinese Patent Application No. 201822224536.8, filed on Dec. 27, 2018 and entitled "BATTERY PACK," each of which is incorporated herein by reference in its entirety.

TECHNICAL FIELD

This disclosure relates to the technical field of energy storage devices, and in particular, to a battery pack.

BACKGROUND

Safety performance of electric vehicles has always been of top concern in the industry. A battery pack of an electric vehicle is mounted between a floor of the electric vehicle and a passenger compartment. If the electric vehicle is strongly impacted in an accident, or if a battery is affected due to drastic changes in external heat, electricity and other factors, thermal runaway phenomenon may occur in the battery pack mounted in the electric vehicle.

Currently, a practice in response to thermal runaway of the battery is that an upper cover of the battery pack is made of a high-temperature-resistant material, so as to prevent high-temperature gas from melting the upper cover due to the thermal runaway of the battery pack and from spraying to the passenger compartment of the vehicle, and thus avoiding personal injury or even casualties to passengers in the passenger compartment. However, that the upper cover of the battery pack is made of the high-temperature-resistant material may not only increase production cost of the battery pack, but also increase an overall weight of the battery pack. In additional, the process of the thermal runaway of the battery is usually accompanied with chemical reactions. The gas generated in the battery causes sharp increase of internal pressure in the battery pack, if an explosion-proof valve disposed on the battery pack is unable to open quickly, heat in the battery gradually rises, and leads to thermal runaway of other batteries. Therefore, the explosion-proof valve not only increases the production cost and overall weight of the battery pack, but may be unable to release pressure in the battery in time.

SUMMARY

It is desired to provide a battery pack to solve the problem of difficulty of exhausting hot gas in the battery pack.

To achieve the foregoing objective, a battery pack is provided, including: an upper cover including an upper cover body and an explosion-proof exhaust structure, wherein the upper cover body includes a top plate in an upper part and a side plate, and an opening in a lower part, wherein the explosion-proof exhaust structure is disposed on the side plate, and an exhaust duct is provided between the top plate and the explosion-proof exhaust structure; and a lower housing, wherein the upper cover is disposed above the lower housing, the lower housing is disposed with batteries, and each of the batteries is provided with an explosion-proof valve.

Further, the explosion-proof exhaust structure is an explosion-proof valve, the side plate is provided with a mounting hole for the explosion-proof valve, and the explosion-proof valve is mounted in the mounting hole for the explosion-proof valve.

Further, the explosion-proof exhaust structure is a pressure relief groove, and the pressure relief groove is a weak region that does not penetrate through the side plate.

Further, the battery pack further includes at least two oppositely arranged vertical plates located on a lower surface of the top plate and extending downward from the lower surface of the top plate, a space of a lower opening is formed by the vertical plates and the lower surface of the top plate and serves as the exhaust duct, and the explosion-proof exhaust structure is disposed at an end of the exhaust duct.

Further, the battery pack further includes: at least two oppositely arranged vertical plates located on a lower surface of the top plate and extending downward from the lower surface of the top plate; and a duct roof disposed below the top plate and connected to the vertical plates, and a space of a lower opening is formed by the vertical plates and a lower surface of the duct roof and serves as the exhaust duct, and the explosion-proof exhaust structure is disposed at the end of the exhaust duct.

Further, the explosion-proof exhaust structure is correspondingly set at each end of the exhaust duct.

Further, the lower opening of the exhaust duct is positioned corresponding to the explosion-proof valve of the battery.

Further, a sealing ring is disposed between the upper cover and the lower housing.

Further, the battery pack further includes a heat insulation cushion, wherein the heat insulation cushion is an annular structure, the heat insulation cushion is disposed around the explosion-proof valve of an individual battery, a lower end face of the heat insulation cushion is tightly attached to a top cover plate of the battery, and an upper end face of the heat insulation cushion is attached to a frame of the lower opening of the exhaust duct.

Further, the heat insulation cushion is disposed around explosion-proof valves of a plurality of batteries.

In contrast to existing technologies, the technical solution disclosed above has the following advantages: the exhaust structure of the upper cover of the battery pack is disposed on the side plate, and hot gas rapidly increased in the battery pack due to thermal runaway is exhausted from a lateral side by the explosion-proof exhaust structure disposed on the side plate, thereby effectively reducing safety hazards to a passenger compartment caused by the hot gas exhausted upward from the battery pack. In addition, the battery pack can be manufactured by improving an existing upper cover structure, thereby possessing advantages of cost-efficiency and significant effects.

REFERENCE NUMERALS

1. Upper cover;
11. Top plate;
12. Side plate;
2. Lower housing;
3. Explosion-proof exhaust structure;
4. Exhaust duct;
41. Vertical plate;
42. Duct roof;
5. Battery;
51. Explosion-proof valve;
6. Sealing ring;
7. Heat insulation cushion.

DETAILED DESCRIPTION OF EMBODIMENTS

To describe the technical content, structural features, objectives, and effects of the technical solution in detail, the following describes the technical solution in detail with reference to specific embodiments and drawings.

In the context of this disclosure, unless otherwise expressly specified and defined, the terms "first", "second", and "third" are for the purpose of description rather than indicating or implying any order of preference; unless otherwise expressly specified, the term "a plurality of" means two or more; and the terms such as "connect" and "fix" are to be understood in a broad sense. For example, a "connection" may be a fixed connection, or a detachable connection, or an integrated connection, or an electrical connection; and may be a direct connection or an indirect connection implemented through an intermediate medium. A person of ordinary skill in the art can understand the specific meanings of the terms in this disclosure according to the context.

Understandably, in the context of this disclosure, the words of direction such as "on", "above", "under", "below", "left", and "right" described in the embodiments of this disclosure are described from a perspective shown in the drawings, and shall not be understood as a limitation on the embodiments of this disclosure. In addition, understandably, depending on the context, one element described as being connected "on/above" or "under/below" another element not only means that the element may be directly connected "on/above" or "under/below" the other element, but also means that the element may be indirectly connected "on/above" or "under/below" the other element through an intermediate element.

Referring to FIG. 1 to FIG. 5, an embodiment of this disclosure provides a battery pack, including: an upper cover 1 and a lower housing 2. The upper cover 1 includes an upper cover body and an explosion-proof exhaust structure(s) 3. The explosion-proof exhaust structure 3 is a structure that exhausts hot gas inside the pack outward.

The upper cover body includes a top plate 11 in an upper part and a side plate 12 at a side, and includes an opening in a lower part. The side plate 12 may be an integrally formed structure, or may be formed by a plurality of side plates 12 that are enclosed together. The top plate 11 in the upper part is disposed above an upper opening of the side plate.

The explosion-proof exhaust structure 3 is disposed on the side plate 12. An exhaust duct 4 is provided between the top plate 11 and the explosion-proof exhaust structure 3. Hot gas is exported through the exhaust duct 4 and exhausted at the explosion-proof exhaust structure 3, thus the hot gas is prevented from being exhausted upward from the top plate 11 to affect personal safety of passengers in the passenger compartment.

The upper cover 1 is mounted on a top of the lower housing 2. The lower housing 2 is disposed with at least one battery 5, and each battery is provided with an explosion-proof valve 51 thereon.

If a battery 5 in the lower housing 2 is subjected to the thermal runaway, a pressure inside the battery 5 increases sharply, and the explosion-proof valve 51 on the battery 5 bursts open, and the pressure in the battery 5 is released at a top cover of the battery. The pressure in the battery 5 is further exported through the exhaust duct 4 and exhausted at the explosion-proof exhaust structure 3 disposed at the side plate 12.

In some embodiment, the explosion-proof exhaust structure 3 is an explosion-proof valve. The side plate 12 is provided with a mounting hole for the explosion-proof valve. The explosion-proof valve is mounted in the mounting hole for the explosion-proof valve. A diameter of the mounting hole is adapted to an outer diameter of the explosion-proof valve. The explosion-proof valve is closely connected to the mounting hole for the explosion-proof valve by a sealing element. The sealing element may be a sealing ring or any other sealing structure. When the hot gas inside the battery 5 is released, i.e., exported through the exhaust duct 4 to the explosion-proof exhaust structure 3, the sharply increased pressure in the exhaust duct 4 forces the explosion-proof valve 51 to open, thereby exhausting the pressure outward. In this process, the explosion-proof valve 51 is in a fixed position relative to the mounting hole for the explosion-proof valve.

In some embodiments, the explosion-proof exhaust structure 3 is a pressure relief groove. The pressure relief groove is a weak region that does not penetrate through the side plate 12. The pressure relief groove refers to: the explosion-proof exhaust structure 3 at a region of the side plate 12 that is thinner than at other parts of the side plate 12. Therefore, under normal operation, the explosion-proof exhaust structure 3 can still meet sealing requirements of the battery pack. When the battery 5 in the battery pack is subjected to thermal runaway, the pressure in the exhaust duct 4 may burst the explosion-proof exhaust structure 3 to outward exhaust the hot gas in the battery pack.

The pressure relief groove may be a groove-like structure provided on the side plate 12. There may be one groove-like structure, and the groove-like structure may be circular, elliptical, triangular, quadrilateral, long strip shape, letter shape or any other processible shape. The groove-like structure may include at least two groove-like structure units. The groove-like structure unit may be circular, elliptical, triangular, quadrilateral, long strip shape, letter shape, or any other processible shape. The groove-like structure may include the groove-like structure units in a regular array form. The higher a density of the groove-like structure units, the less difficultly the explosion-proof exhaust structure 3 is to be burst. The lower the density of the groove-like structure units, the more difficultly the explosion-proof exhaust structure 3 is to be burst. In addition, a depth of the groove-like structure also determines the exhausting difficulty of the explosion-proof exhaust structure 3. The deeper the depth of the groove-like structure, the less difficultly the explosion-proof exhaust structure 3 is to be burst. The shallower the depth of the groove-like structure, the more difficultly the explosion-proof exhaust structure 3 is to be burst.

Figure 1:
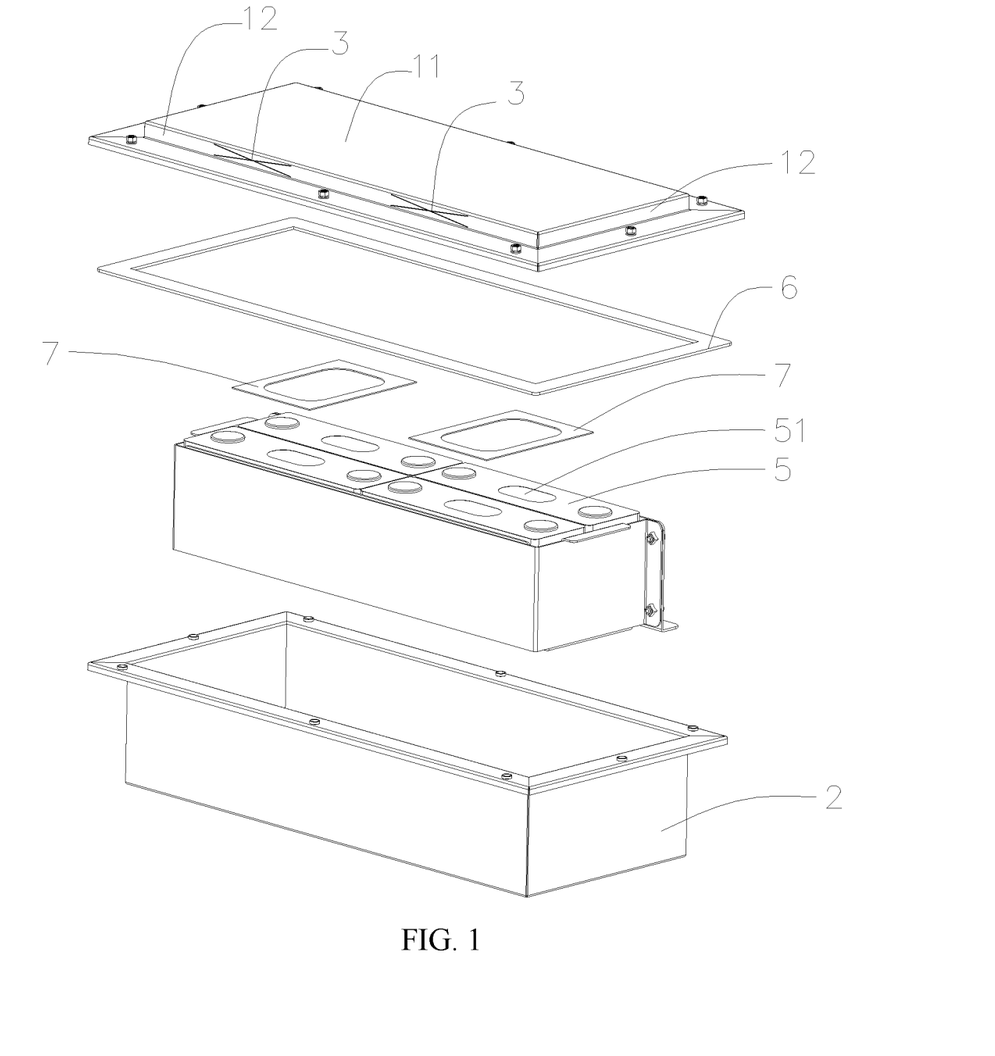
FIG. 1 is an exploded view of an overall structure of a battery pack according to an embodiment of the disclosure.
Figure 2:
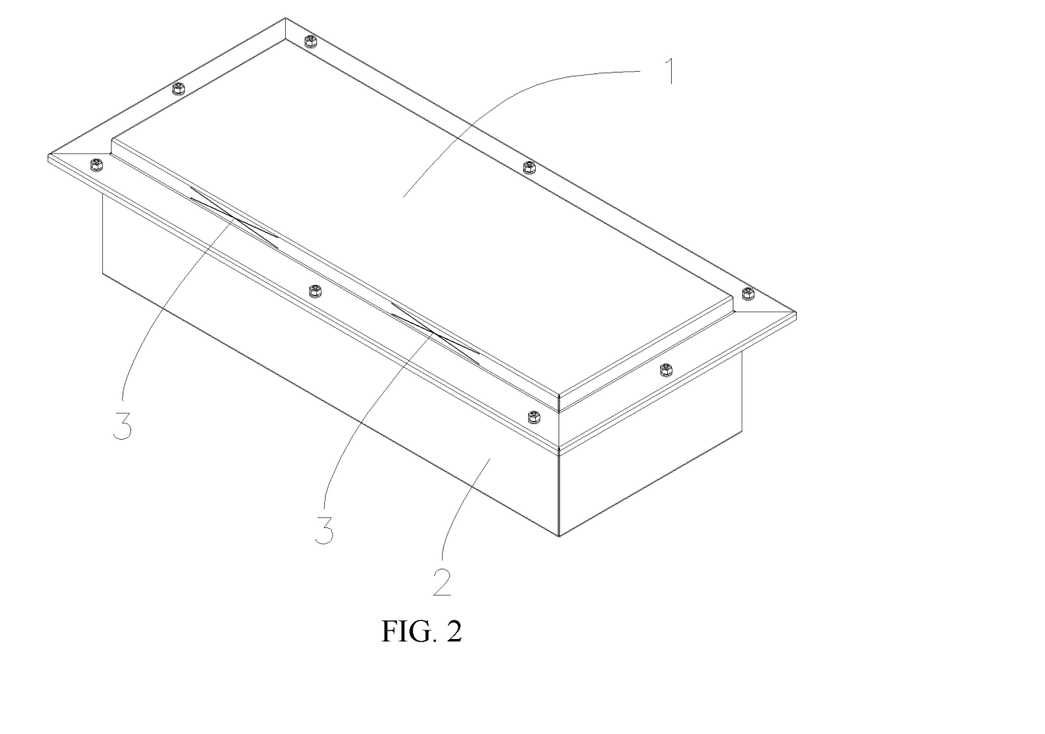
FIG. 2 is a schematic diagram of an overall structure of a battery pack according to an embodiment of the disclosure.
Figure 3:
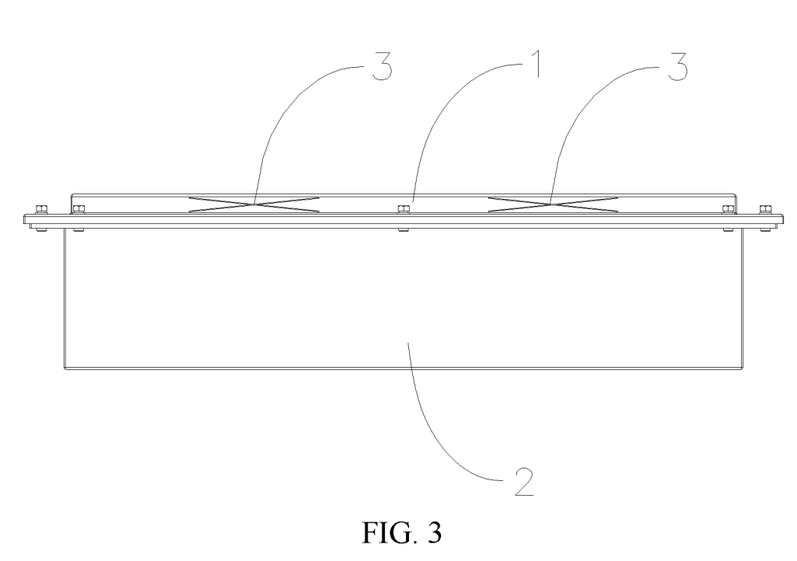
FIG. 3 is a side view of a battery pack according to an embodiment of the disclosure.
Figure 4:
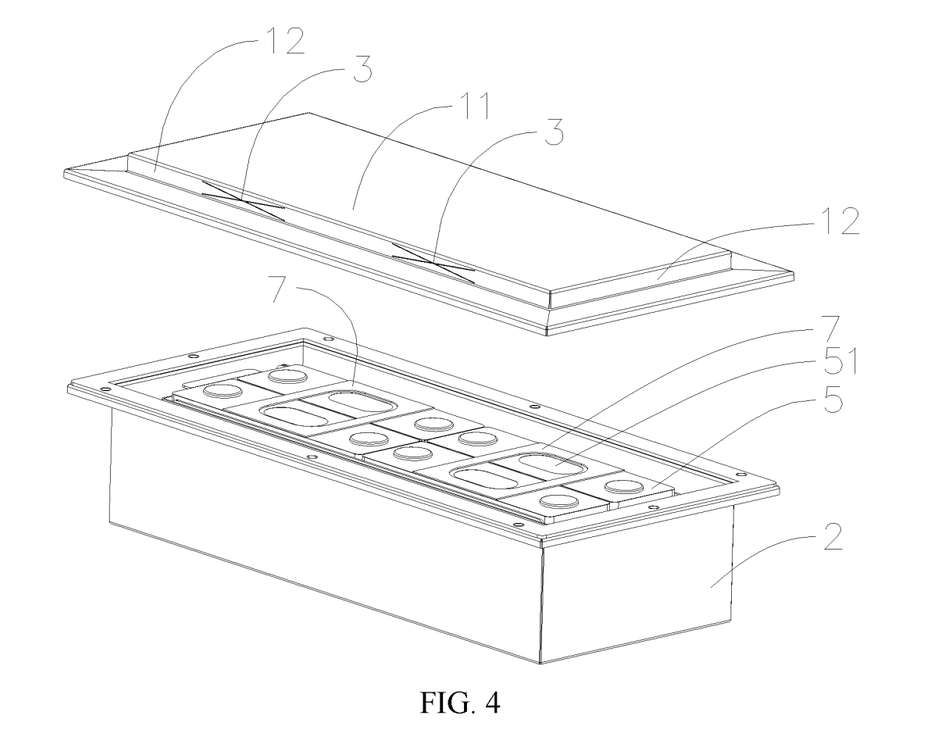
FIG. 4 is a schematic structural diagram of batteries mounted in a battery pack according to an embodiment of the disclosure.
Figure 5:
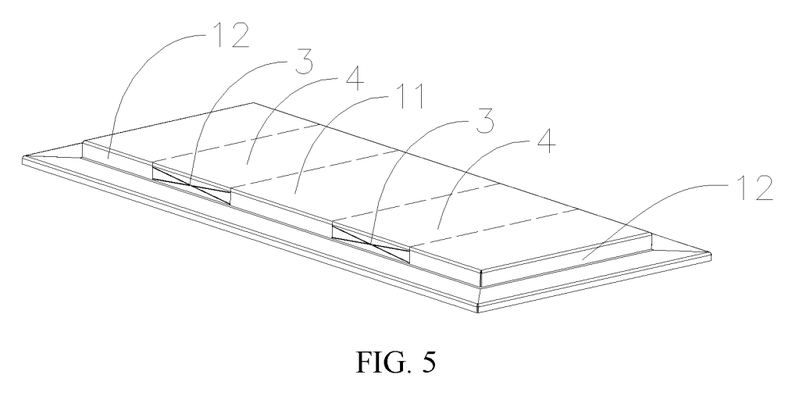
FIG. 5 is a schematic structural diagram of an upper cover body of a battery pack according to an embodiment of the disclosure.

As shown in FIG. 5, in some embodiments, the battery pack further includes at least two oppositely arranged vertical plates 41 located on a lower surface of the top plate and extending downward from the lower surface of the top plate. A space of a lower opening formed by the vertical plates 41 and the lower surface of the top plate serves as the exhaust duct 4. The explosion-proof exhaust structure 3 is disposed at an end of the exhaust duct 4. The two vertical plates 41 are the same in shape and size. Lower end faces of the two oppositely arranged vertical plates 41 are flush with each other, and two end faces of the two oppositely arranged vertical plates 41 at each end side are flush with each other. The exhaust duct 4 formed by the vertical plates 41 and the lower surface of the top plate is U-shaped in cross section. Two end sides of the exhaust duct 4 are connected with the oppositely arranged side plates 12 respectively. A respective end side of the exhaust duct 4 corresponds to a position of the explosion-proof exhaust structure 3 disposed on the side plate 12. In some embodiments, the top plate 11 is made of a material with a temperature resistance value greater than 1000° C. and an impact resistance value greater than 100 MPa.

Figure 6:
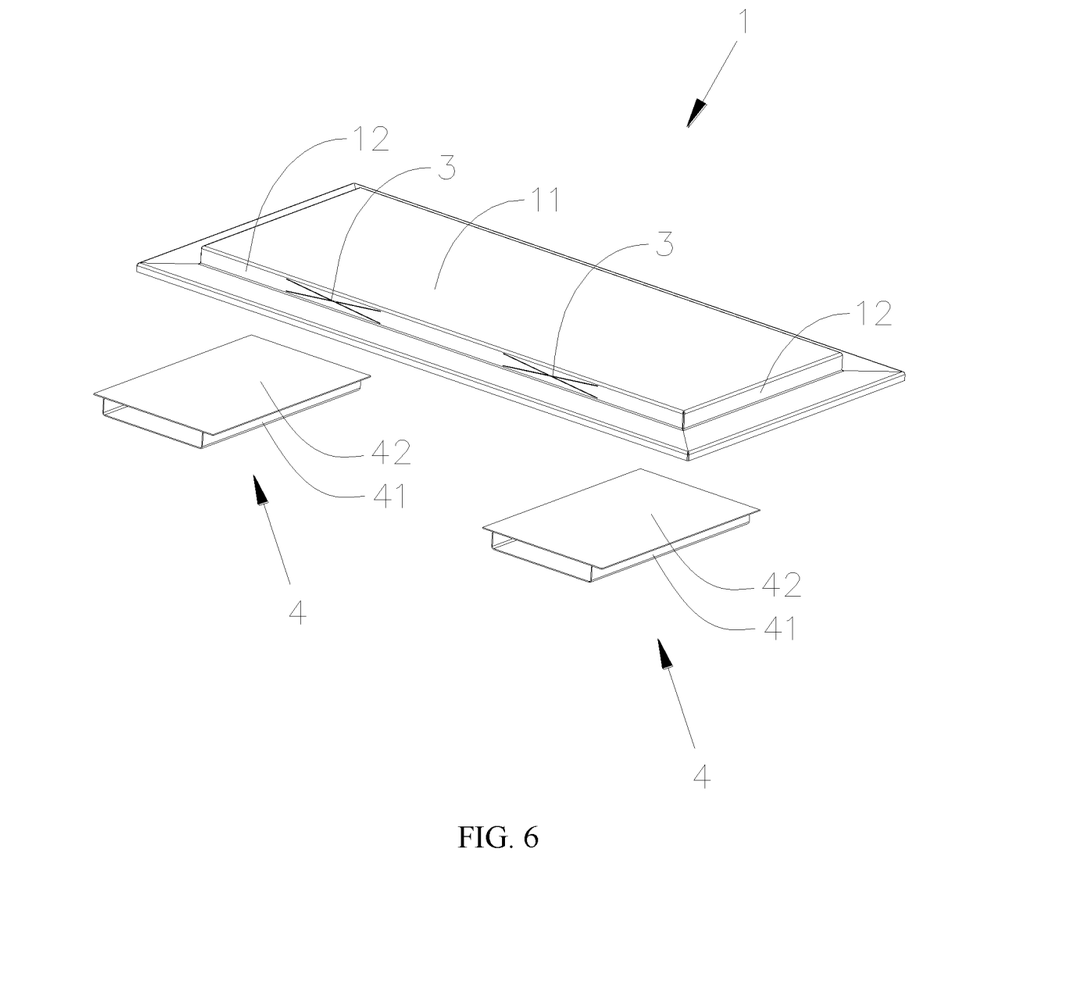
FIG. 6 is a schematic structural exploded view of an upper cover body of a battery pack according to an embodiment of the disclosure.

As shown in FIG. 6, in some embodiments, the battery pack further includes: at least two oppositely arranged vertical plates 41 located on the lower surface of the top plate and extending downward from the lower surface of the top plate; and a duct roof 42. The duct roof 42 is disposed below the top plate 11 and connected to the vertical plates 41. A space of a lower opening formed by the vertical plates 41 and a lower surface of the duct roof 42 serves as the exhaust duct 4. The explosion-proof exhaust structure 3 is disposed at the end of the exhaust duct 4. The two vertical plates 41 are the same in shape and size. Lower end faces of the two oppositely arranged vertical plates 41 are flush with each other, and two end faces of the two oppositely arranged vertical plates 41 at each end side are flush with each other. The exhaust duct 4 formed by the vertical plates 41 and the duct roof 42 is U-shaped in cross section. Two end sides of the exhaust duct 4 are connected with the oppositely arranged side plates 12 respectively. A respective end side of the exhaust duct 4 corresponds to a position of the explosion-proof exhaust structure 3 disposed on the side plate 12. In some embodiments, the duct roof 42 is made of a material with a temperature resistance value greater than 1000° C. and an impact resistance value greater than 100 MP In some embodiments, each end of the exhaust duct 4 is provided with the explosion-proof exhaust structure 3 correspondingly. That is, after the hot gas in the battery pack enters the exhaust duct 4, the hot gas can be exhausted from the explosion-proof exhaust structures 3 at both ends of the exhaust duct 4, thereby increasing exhausting speed of the hot gas from the pack and improving safety of the battery pack.

In some embodiments, there are two or more exhaust ducts 4. When there are two or more rows of the batteries 5 in the battery pack, the number of the exhaust ducts 4 shall correspond to the row number of the batteries 5, thereby achieving a shortest path for exhausting the hot gas. When an explosion-proof valve 51 of any battery 5 in any row of batteries 5 is opened, the hot gas directly enters the exhaust duct 4 directly above the explosion-proof valve. The hot gas in the exhaust duct 4 is directly exhausted out of the explosion-proof exhaust structure 3 at the end of the exhaust duct 4.

In some embodiments, the lower opening of the exhaust duct 4 is positioned corresponding to the explosion-proof valve 51 of the battery 5. In this way, the hot gas from the battery 5 can be exhausted along a shortest path. If the battery 5 is subjected to thermal runaway, the hot gas is exhausted from the explosion-proof valve 51 of the battery 5 into the exhaust duct 4 directly, and then exported through the exhaust duct 4 and the explosion-proof exhaust structure 3. The shortest path for exhausting the hot gas enables the hot gas released from the battery 5 to be exhausted at a highest speed, thereby effectively improving safety performance of the battery pack.

In some embodiments, a sealing ring 6 is disposed between the upper cover structure and the lower housing 2. The configuration of the sealing ring 6 disposed between the upper cover structure and the lower housing 2 implements sealing connection between the upper cover structure and the lower housing 2.

In some embodiments, the battery pack further includes a heat insulation cushion 7. The heat insulation cushion 7 is an annular structure. The heat insulation cushion 7 is disposed around the explosion-proof valve 51 of the battery 5. A lower end face of the heat insulation cushion 7 is tightly attached to a top cover plate of the battery 5. An upper end face of the heat insulation cushion 7 is attached to a frame of the lower opening of the exhaust duct 4. The explosion-proof valve 51 of the battery 5 is positioned within an inner ring of the heat insulation cushion 7. The heat insulation cushion 7 provides a directional sealing function for the hot gas of the battery 5. The hot gas exhausted from the battery 5 passes through a channel formed by the inner ring of the heat insulation cushion 7, and enters the lower opening of the exhaust duct 4. Then the hot gas is exported through the exhaust duct 4 and exhausted from the explosion-proof exhaust structure 3 disposed on the side plate 12. The heat insulation cushion 7 is made of a tough material. The upper end face of the heat insulation cushion 7 is tightly attached to a frame of the lower opening of the exhaust duct 4. The lower end face of the heat insulation cushion 7 is tightly attached to the top cover of the battery 5.

In some embodiments, the heat insulation cushion 7 is disposed around explosion-proof valves 51 of a plurality of batteries 5. The batteries 5 in the battery pack are arranged in rows. For the heat insulation cushion 7, the explosion-proof valves 51 of a row of batteries 5 may be disposed within the inner ring of the heat insulation cushion 7. If any battery 5 in the row of batteries 5 exhausts hot gas upward through the explosion-proof valve 51, the hot gas can be exhausted directionally through the same heat insulation cushion 7.

It needs to be noted that although the foregoing embodiments have been described herein, the patent protection scope of this disclosure is not limited to the embodiments. Therefore, any changes and modifications made to the embodiments hereof based on the innovative concept of this disclosure, any equivalent structural alterations or equivalent process alterations made by using the content of the specification and drawings of this disclosure, and any direct or indirect disclosure of the foregoing technical solutions to another related technical field, shall fall within the patent protection scope of this disclosure.

What is claimed is:

1. A battery pack, comprising:
    an upper cover comprising:
        an upper cover body, wherein the upper cover body comprises a top plate in an upper part and a side plate, and
        a plurality of pairs of explosion-proof exhaust structures disposed on the side plate, the explosion-proof exhaust structures of each pair are oppositely arranged,
        an opening in a lower part,
        a plurality of exhaust ducts corresponding to the plurality of pairs of explosion-proof exhaust structures, wherein the exhaust ducts are separately and parallelly disposed between the top plate and the opening, wherein each one of the plurality of exhaust ducts has two ends respectively connected to the two oppositely arranged explosion-proof exhaust structures of the corresponding pair of explosion-proof exhaust structures; and
    a lower housing, wherein the upper cover is disposed above the lower housing, the lower housing is disposed with a plurality of batteries positioned corresponding to the plurality of exhaust ducts, and each one of the batteries is provided with a first explosion-proof valve,
    wherein each one of the exhaust ducts has a lower opening, each one of the lower openings is positioned corresponding to the first explosion-proof valve of the corresponding battery and configured to release hot gas generated from the corresponding battery through the pair of explosion-proof exhaust structures of the corresponding exhaust duct through a shortest path when the first explosion-proof valve is open, wherein the hot gas is prevented from being exhausted upward from the top plate.

2. The battery pack according to claim 1, wherein each one of the explosion-proof exhaust structures is a second explosion-proof valve, the side plate is provided with a mounting hole for each second explosion-proof valve, and each second explosion-proof valve is mounted in the mounting hole.

3. The battery pack according to claim 1, wherein each one of the explosion-proof exhaust structures is a pressure relief groove, and the pressure relief groove is disposed in a weak region of the side plate, the weak region is thinner than other parts of the side plate and does not penetrate through the side plate.

4. The battery pack according to claim 1, wherein the battery pack further comprises at least two oppositely arranged vertical plates located on a lower surface of the top plate and extending downward from the lower surface of the top plate, a space of a lower opening is formed by the vertical plates and the lower surface of the top plate and serves as each one of the exhaust ducts.

5. The battery pack according to claim 1, wherein the battery pack further comprises:
    at least two oppositely arranged vertical plates located on a lower surface of the top plate and extending downward from the lower surface of the top plate; and
    a duct roof disposed below the top plate and connected to the vertical plates, and a space of a lower opening is formed by the vertical plates and a lower surface of the duct roof and serves as each one of the exhaust ducts.

6. The battery pack according to claim 1, wherein a sealing ring is disposed between the upper cover and the lower housing.

7. The battery pack according to claim 1, further comprising a heat insulation cushion, wherein the heat insulation cushion is an annular structure, the heat insulation cushion is disposed around the first explosion-proof valve of an individual battery, a lower end face of the heat insulation cushion is tightly attached to a top cover plate of the battery, and an upper end face of the heat insulation cushion is attached to a frame of the lower opening of one or more of the exhaust ducts.

8. The battery pack according to claim 1, wherein a heat insulation cushion is disposed around multiple battery explosion-proof valves.

* * * * *